(12) United States Patent
Ichikawa et al.

(10) Patent No.: US 10,791,605 B2
(45) Date of Patent: Sep. 29, 2020

(54) LAMP MODULE

(71) Applicant: KOITO MANUFACTURING CO., LTD., Tokyo (JP)

(72) Inventors: Tomoyuki Ichikawa, Shizuoka (JP); Hironori Tsukamoto, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 16/707,035

(22) Filed: Dec. 9, 2019

(65) Prior Publication Data

US 2020/0187329 A1 Jun. 11, 2020

(30) Foreign Application Priority Data

Dec. 10, 2018 (JP) ................. 2018-231047
Nov. 18, 2019 (JP) ................. 2019-207672

(51) Int. Cl.
| | |
|---|---|
| H05B 45/46 | (2020.01) |
| H05B 45/345 | (2020.01) |
| B60Q 1/04 | (2006.01) |
| F21V 29/70 | (2015.01) |

(52) U.S. Cl.
CPC .............. *H05B 45/46* (2020.01); *B60Q 1/04* (2013.01); *F21V 29/70* (2015.01); *H05B 45/345* (2020.01); *B60Q 2400/30* (2013.01)

(58) Field of Classification Search
CPC ...... H05B 45/46; H05B 45/345; H05B 33/08; H05B 45/00; H05B 45/10; H05B 45/14; H05B 45/20; H05B 45/24; H05B 45/37; H05B 45/44; H05B 45/48; H05B 45/50; H05B 47/10; H05B 47/19; H05B 37/00; H05B 37/02; H05B 41/16; F21V 29/70; F21V 23/009; B60Q 1/04; B60Q 2400/30; F21S 8/02; F21Y 2115/10
See application file for complete search history.

(56) References Cited

U.S. PATENT DOCUMENTS

| | | | |
|---|---|---|---|
| 9,915,778 B2 * | 3/2018 | Chen ...................... | H05K 1/189 |
| 2006/0175901 A1 | 8/2006 | Murakami et al. | |
| 2011/0234113 A1 * | 9/2011 | Ku .......................... | H05B 45/46 |
| | | | 315/192 |
| 2013/0200812 A1 * | 8/2013 | Radermacher ......... | H05B 33/08 |
| | | | 315/186 |
| 2015/0373790 A1 * | 12/2015 | Boswinkel ............. | H05B 45/46 |
| | | | 315/186 |

(Continued)

FOREIGN PATENT DOCUMENTS

JP    2006-221886 A    8/2006

*Primary Examiner* — Renan Luque
(74) *Attorney, Agent, or Firm* — Sughrue Mion, PLLC

(57) ABSTRACT

A lamp module includes a drive circuit; a first light source; a second light source; and a switching circuit configured to receive a switching signal for indicating switching between a first function and a second function, and to control a first switch and a second switch such that the first switch is in an on state and the second switch is in an off state while the first function is indicated, the first switch is in an off state and the second switch is in an on state while the second function is indicated, and both the first switch and the second switch are in the on states at a time of switching between the first function and the second function.

7 Claims, 10 Drawing Sheets

(56) References Cited

U.S. PATENT DOCUMENTS

| | | | |
|---|---|---|---|
| 2016/0255687 A1* | 9/2016 | Zhang | H05B 47/16 |
| | | | 315/210 |
| 2016/0295647 A1* | 10/2016 | Lin | H05B 45/50 |
| 2017/0339760 A1* | 11/2017 | Seki | H05B 45/48 |
| 2018/0027626 A1* | 1/2018 | Wang | H05B 45/24 |
| | | | 315/186 |
| 2018/0035502 A1* | 2/2018 | Raniero | H05B 45/00 |
| 2018/0080644 A1* | 3/2018 | Johnson, III | H01L 33/642 |
| 2018/0352622 A1* | 12/2018 | Ng | H05B 45/24 |

* cited by examiner

US 10,791,605 B2

LAMP MODULE

CROSS-REFERENCE TO RELATED APPLICATION

This application claims priority to Japanese Patent Application No. 2018-231047 filed on Dec. 10, 2018 and Japanese Patent Application No. 2019-207672 filed on Nov. 18, 2019, incorporated herein by reference in their entireties.

BACKGROUND

1. Technical Field

The disclosure relates to a lamp module that is used for a vehicle or the like.

2. Description of Related Art

A vehicular lamp (for example, a headlamp) has a plurality of functions such as a high-beam function, a low-beam function, a function of serving as a clearance lamp (a position lamp), and a function of serving as a daytime running lamp (DRL).

FIG. 1 is a block diagram illustrating a lamp system 1R including a vehicular lamp 10R according to related art. FIG. 1 illustrates blocks associated with a low-beam function and a high-beam function. The vehicular lamp 10R receives a direct-current voltage (an input voltage $V_{IN}$) from a battery 2 via a switch 4 and illuminates a low-beam light source 12L and a high-beam light source 12H using the input voltage $V_{IN}$ as a power source. Each of the light sources 12H and 12L includes a plurality of light emitting elements (for example, LEDs) provided in series (or in parallel).

The vehicular lamp 10R includes a low-beam lighting circuit 14L and a high-beam lighting circuit 14H. An H/L switching signal for switching between a high-beam function and a low-beam function is input to the vehicular lamp 10R. When the input voltage $V_{IN}$ is supplied, the lighting circuit 14L supplies a drive current $I_{LED1}$ to the light source 12L and illuminates the light source 12L.

The lighting circuit 14H is switched between an enable (operation, ON) state and a disable (non-operation, OFF) state in accordance with the H/L switching signal, and supplies a drive current $I_{LED2}$ to the light source 12H to illuminate the light source 12H when the lighting circuit 14H is in the enable state.

SUMMARY

In the vehicular lamp 10R in the related art, the high-beam function and the low-beam function are formed as independent circuits and thus the cost and size of the vehicular lamp 10R in the related art are large.

The disclosure provides a lamp module that can switch between a plurality of functions.

An aspect of the disclosure relates to a lamp module configured to switch between a first function and a second function. The lamp module includes a drive circuit with a constant-current output; a first light source including M light emitting elements and a first switch that are connected in series to an output of the drive circuit, M being equal to or larger than 1; a second light source including N light emitting elements and a second switch that are connected in series, the second light source being provided in parallel to a series-connected circuit including a part of or all of the M light emitting elements and the first switch, N being equal to or larger than 1; and a switching circuit configured to receive a switching signal for indicating switching between the first function and the second function, and to control the first switch and the second switch such that the first switch is in an on state and the second switch is in an off state while the first function is indicated, the first switch is in an off state and the second switch is in an on state while the second function is indicated, and both the first switch and the second switch are in the on states at a time of switching between the first function and the second function.

Another aspect of the disclosure relates to a lamp module configured to switch between a first function and a second function. The lamp module includes a first light source including M light emitting elements, M being equal to or larger than 1; a second light source including N light emitting elements, N being equal to or larger than 1; a drive circuit with a constant-current output that is provided for both the first light source and the second light source; and a switching circuit configured to receive a switching signal for indicating switching between the first function and the second function, and to switch a path of an output current of the drive circuit such that the output current of the drive circuit flows in the first light source while the first function is indicated, the output current of the drive circuit flows in the second light source while the second function is indicated, and the output current of the drive circuit flows in both the first light source and the second light source at a time of switching between the first function and the second function.

Combinations of the above-mentioned elements, or a method, a device, a system, and the like that are obtained based on elements of the disclosure or obtained by changing expressions of the disclosure are effective aspects of the disclosure.

According to the aspects of the disclosure, it is possible to provide a lamp module having a plurality of functions.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
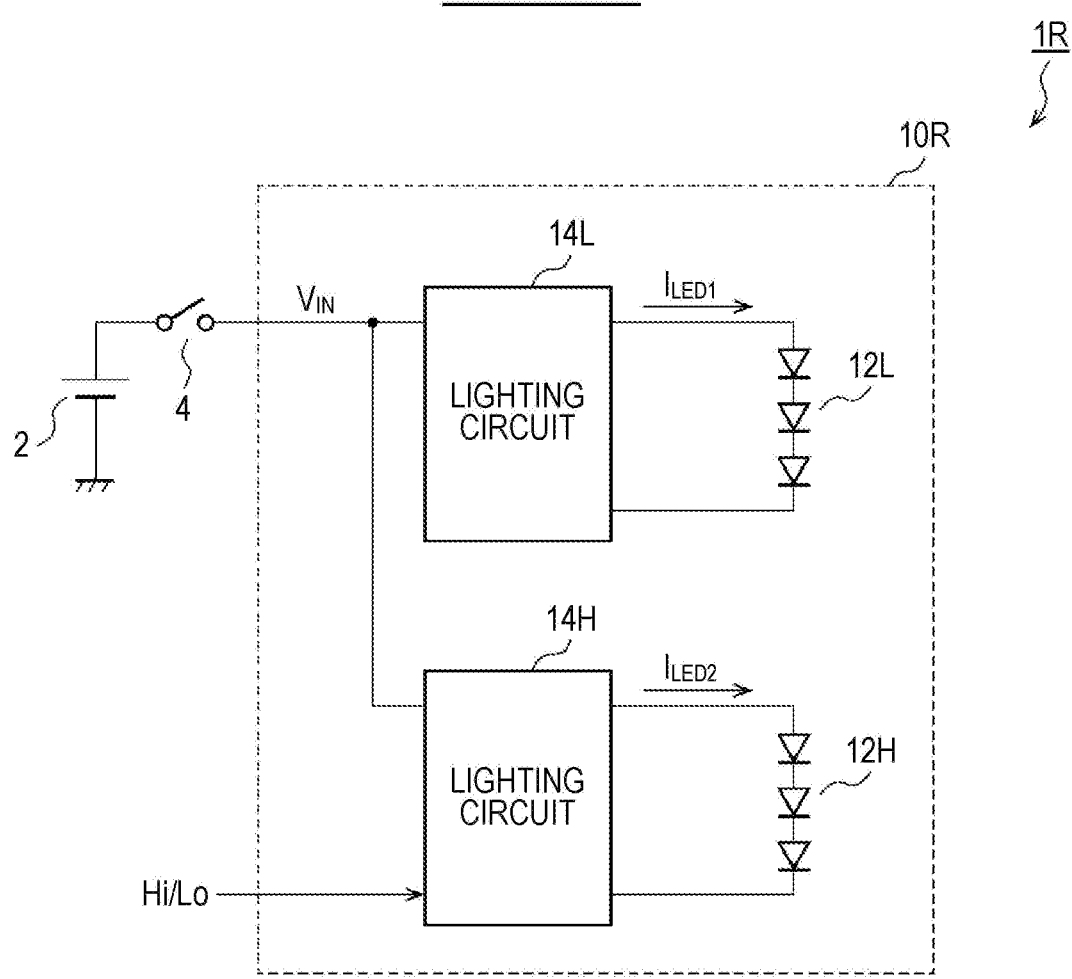
FIG. 1 is a block diagram illustrating a lamp system including a vehicular lamp according to related art.

An embodiment disclosed in the present disclosure relates to a lamp module configured to switch between a first function and a second function. The lamp module includes a drive circuit with a constant-current output; a first light source including M light emitting elements and a first switch that are connected in series to an output of the drive circuit, M being equal to or larger than 1; a second light source including N light emitting elements and a second switch that are connected in series, the second light source being provided in parallel to a series-connected circuit including a part of or all of the M light emitting elements and the first switch, N being equal to or larger than 1; and a switching circuit configured to receive a switching signal for indicating switching between the first function and the second function, and to control the first switch and the second switch such that the first switch is in an on state and the second switch is in an off state while the first function is indicated, the first switch is in an off state and the second switch is in an on state while the second function is indicated, and both the first switch and the second switch are in the on states at a time of switching between the first function and the second function.

Since the drive circuit is provided for both the first light source and the second light source, it is possible to reduce the size and cost. Further, it is possible to prevent both the first light source and the second light source from being unlit at the time of switching between the first function and the second function.

The first function may be a low-beam function and the second function may be a high-beam function. M may be equal to or larger than 2. The series-connected circuit may include the part of the M light emitting elements and the first switch. With this configuration, even when the high-beam is illuminated, the rest of the M light emitting elements can be kept illuminated and thus a low beam can be illuminated with illuminance lower than that when the low-beam function is selected.

The M light emitting elements and the N light emitting elements may be cooled by a common heat sink. The drive circuit, the first light source, the second light source, and the switching circuit may be mounted on a common substrate.

The switching signal may be a binary signal with high and low values; the switching circuit may be configured to generate a first control signal that is supplied to the first switch and a second control signal that is supplied to the second switch based on the switching signal; and the switching circuit may be configured to delay an edge of each of the first control signal and the second control signal, the edge corresponding to turning-off.

The first function may be a function of serving as a daytime running lamp and the second function may be a function of serving as a clearance lamp.

Hereinafter, embodiments of the disclosure will be described with reference to the accompanying drawings. The same or equivalent elements, members, and processes in the drawings will be denoted by the same reference numerals and signs, and description thereof will be appropriately omitted. The embodiments are examples, and do not limit the disclosure. Not all features described in the embodiments are necessarily essential to the disclosure, and not all combinations thereof are necessarily essential to the disclosure.

In this specification, a "state in which a member A is connected to a member B" includes a case in which the member A and the member B are indirectly connected via another member which does not substantially affect an electrical connection therebetween or does not reduce a function or an effect achieved by the electrical connection, in addition to a case in which the member A and the member B are physically directly connected to each other.

Similarly, a "state in which a member C is disposed between a member A and a member B" includes a case in which the member A and the member C, or the member B and the member C are indirectly connected via another member which does not substantially affect an electrical connection therebetween or does not reduce a function or an effect achieved by the electrical connection, in addition to a case in which the member A and the member C, or the member B and the member C are directly connected to each other.

In this specification, reference numerals and signs, which are assigned to electrical signals such as a voltage signal and a current signal or circuit elements such as a resistor and a capacitor, indicate a voltage value and a current value or a resistance value and a capacitance value when necessary.

Figure 2:
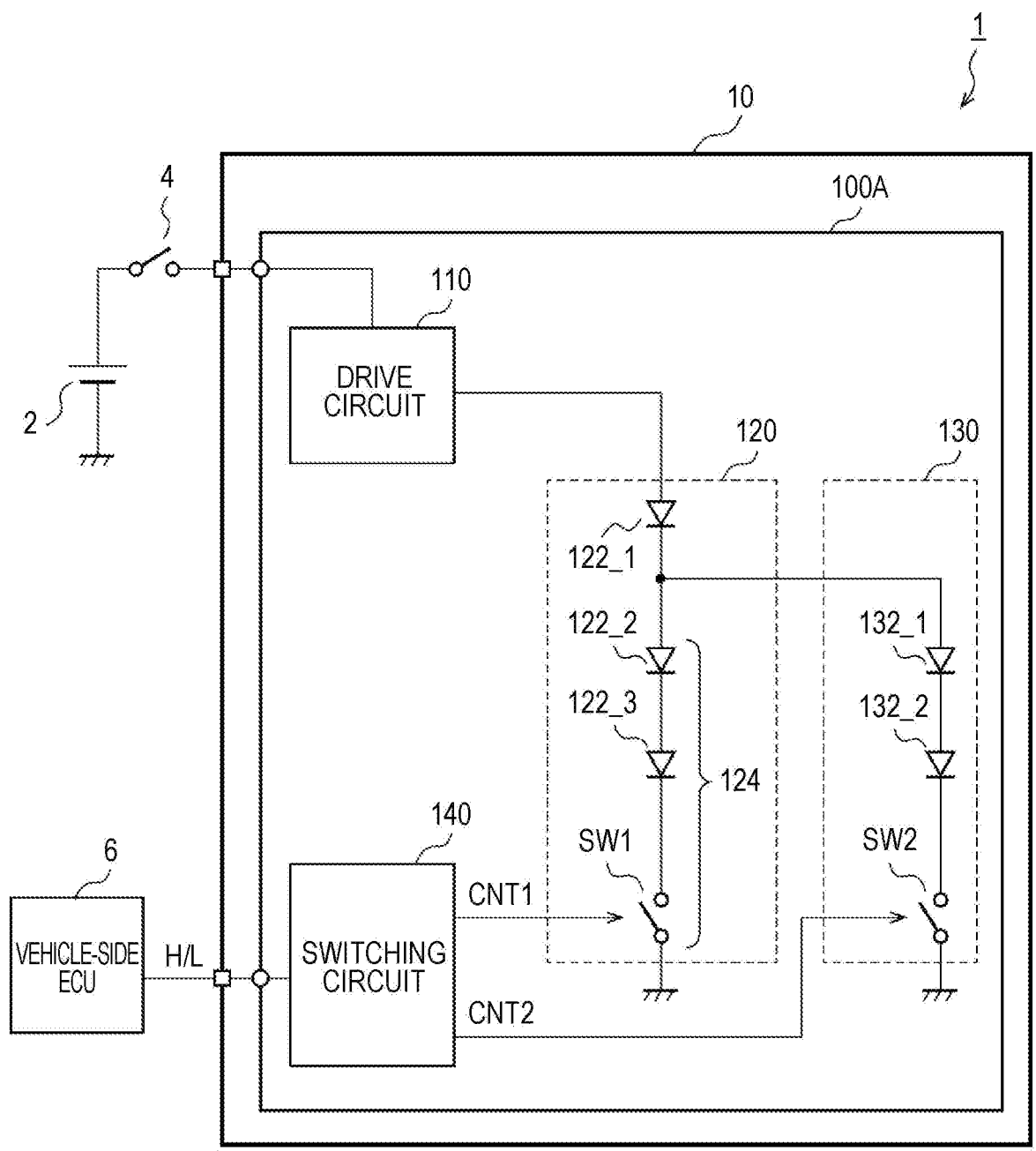
FIG. 2 is a block diagram illustrating a lamp system including a lamp module according to a first embodiment.

FIG. 2 is a block diagram illustrating a lamp system 1 including a lamp module 100A according to a first embodiment. The lamp system 1 includes a battery 2, a switch 4, a vehicle-side electronic control unit (ECU) 6, and a vehicular lamp 10.

The lamp module 100A has a first function and a second function among a plurality of functions of the vehicular lamp 10, and can switch between the first function and the second function. In this embodiment, the vehicular lamp 10 is a headlamp, the first function is a low-beam function, and the second function is a high-beam function.

The lamp module 100A includes a drive circuit 110, a first light source 120, a second light source 130, and a switching circuit 140 which are configured as a unit, and a finished product of the lamp module 100A is assembled into the vehicular lamp 10.

The drive circuit 110 includes a driver with a constant-current output. The configuration of the drive circuit 110 is not particularly limited, and the drive circuit 110 may be a linear regulator with a constant-current output, may be a switching converter (a DC-DC converter) with a constant-current output, or may be a combination of a switching converter with a constant-current output and a constant-current circuit.

The first light source 120 corresponds to the first function (that is, the low-beam function), and includes M (M≥1) light emitting elements 122_1 to 122_M and a first switch SW1 which are connected in series to the output of the drive circuit 110. In the example illustrated in FIG. 2, M=3. As a light emitting element, a light emitting diode (LED) may be appropriately used, but another semiconductor light emitting element such as a laser diode (LD) or an organic electroluminescence (EL) element may be used.

The second light source 130 corresponds to the second function (that is, the high-beam function), and includes N (N≥1) light emitting elements 132_1 to 132_N and a second switch SW2 which are connected in series. In the example illustrated in FIG. 2, N=2. The second light source 130 is provided in parallel to a series-connected circuit 124 including the light emitting elements 122_2 and 122_3, which are a part of the M light emitting elements 122_1 to 122_3, and the first switch SW1 in the first light source 120.

The switching circuit 140 receives an H/L switching signal for indicating switching between the first function (the low-beam function) and the second function (the high-beam function) and generates control signals CNT1 and CNT2 indicating (i.e., specifying) ON or OFF of the first switch SW1 and the second switch SW2. For example, the H/L switching signal may be supplied from the vehicle-side ECU 6. The switching circuit 140 controls the first switch SW1 and the second switch SW2 such that the first switch SW1 is in an ON state and the second switch SW2 is in an OFF state while the low-beam function is indicated (for example, while the H/L switching signal is low). The switching circuit 140 controls the first switch SW1 and the second switch SW2 such that the first switch SW1 is in the OFF state and the second switch SW2 is in the ON state while the high-beam function is indicated (for example, while the H/L switching signal is high). The switching circuit 140 controls the first switch SW1 and the second switch SW2 such that both the first switch SW1 and the second switch SW2 are in the ON states for a certain period at the time of switching between the low-beam function and the high-beam function.

Figure 3:
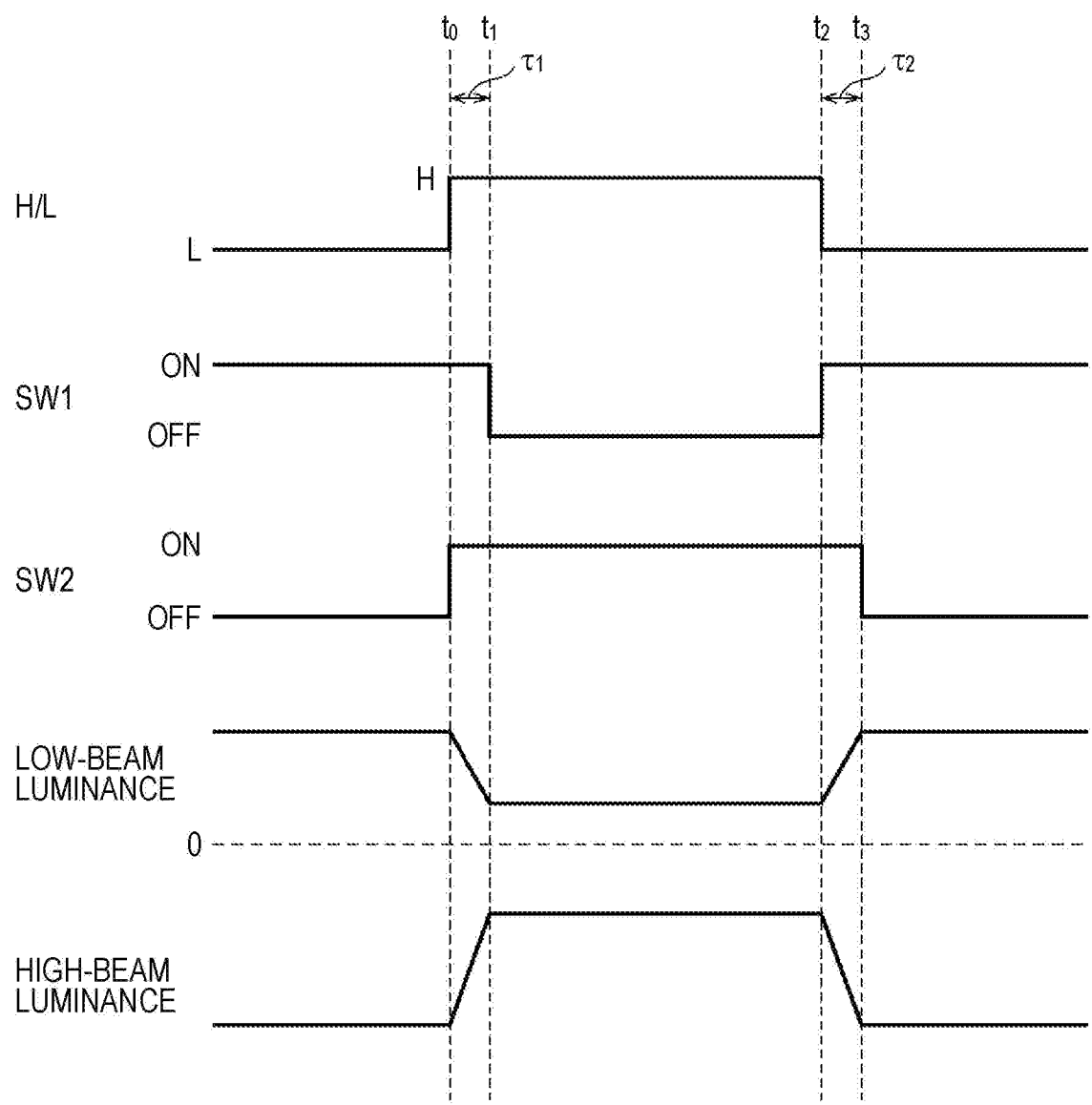
FIG. 3 is a diagram illustrating operation waveforms of the lamp module illustrated in FIG. 2.

The basic configuration of the lamp module 100A has been described above. The operation of the lamp module 100A will be described below. FIG. 3 is a diagram illustrating operation waveforms of the lamp module 100A illustrated in FIG. 2. In a period before time to (i.e., a low-beam period), the H/L switching signal is low, the first switch SW1 is in an ON state, and the second switch SW2 is in an OFF state. Accordingly, an output current $I_{OUT}$ of the drive circuit 110 flows in the light emitting elements 122_1 to 122_3 of the first light source 120, the low-beam is illuminated (i.e., lit), and luminance of a high beam is zero.

When the H/L switching signal is changed to high at time to, the switching circuit 140 turns on the second switch SW2. The switching circuit 140 does not immediately turn off the first switch SW1 and maintains the ON state of the first switch SW1 in a transition period $\tau_1$ from time $t_0$ to time $t_1$. In the transition period $\tau_1$, both the first switch SW1 and the second switch SW2 are in the ON states. Thus, the output current $I_{OUT}$ of the drive circuit 110 is divided and flows into the first light source 120 and the second light source 130, and both the first light source 120 and the second light source 130 are illuminated. The length of the transition period $\tau_1$ may be set to a value in a range of, for example, 50 ms to 500 ms.

At time $t_1$, the first switch SW1 is turned off. Thus, in a period at and after time $t_1$, the second light source 130 is illuminated. Accordingly, the period at and after time $t_1$ is a high-beam period. In the high-beam period, since the output current $I_{OUT}$ of the drive circuit 110 flows via the light emitting element 122_1 which is a part of the first light source 120, luminance of the first light source 120 is not zero and the first light source 120 can be illuminated with luminance lower than that in the low-beam period (one-third (⅓) of luminance in the low-beam period in this example).

When the H/L switching signal is changed to low at time $t_2$, the switching circuit 140 turns on the first switch SW1. The switching circuit 140 does not immediately turn off the second switch SW2 and maintains the ON state of the second switch SW2 in a transition period $\tau_2$ from time $t_2$ to time $t_3$. In the transition period $\tau_2$, both the first switch SW1 and the second switch SW2 are in the ON states. Thus, the output current $I_{OUT}$ of the drive circuit 110 is divided and flows into the first light source 120 and the second light source 130, and both the first light source 120 and the second light source 130 are illuminated. The length of the transition period $\tau_2$ may be set to a value in a range of, for example, 50 ms to 500 ms. The length of the transition period $\tau_2$ may be equal to or different from the transition period $\tau_1$.

At time $t_3$, the second switch SW2 is turned off. Thus, a period at and after time $t_3$ is the low-beam period. In this period, the first light source 120 is illuminated with high luminance and the second light source 130 is unlit.

The operation of the lamp module 100A has been described above. Advantageous effects of the lamp module 100A will be described below. With the lamp module 100A, it is possible to provide a lamp having the high-beam function and the low-beam function as a module. Accordingly, in comparison with a case in which a unit having the high-beam function and a unit having the low-beam function are provided separately from each other, it is possible to simplify an operation of assembling the vehicular lamp 10.

Since two light sources 120 and 130 are driven by a single drive circuit 110, it is possible to decrease the number of components and the cost, and to decrease the size of the lamp module 100A.

In a case where the light sources 120 and 130, which have the low-beam function and the high-beam function, respectively, are provided in a single module, it is difficult to keep the low-beam illuminated throughout the high-beam period due to thermal constraints. However, in a case where each of the first light source 120 and the second light source 130 is exclusively illuminated, both the first light source 120 and the second light source 130 may be unlit due to control delay at the time of switching between the high-beam function and the low-beam function, and thus safety may decrease. According to this embodiment, by inserting the transition periods $\tau_1$ and $\tau_2$ in which the first light source 120 and the second light source 130 are simultaneously illuminated between the low-beam period and the high-beam period, and between the high-beam period and the low-beam period, it is possible to prevent the first light source 120 and the second light source 130 from being simultaneously unlit, and thus it is possible to enhance safety.

By causing the drive current $I_{OUT}$ to flow constantly in the light emitting element 122_1 that is a part of the first light source 120 regardless of the high-beam period or the low-beam period, the light source for the low-beam can be illuminated with low luminance in the high-beam period. Accordingly, it is possible to satisfy thermal constraints and to prevent illuminance of a light distribution area for the low-beam from becoming zero. Thus, it is possible to further enhance the safety.

Figure 4A:
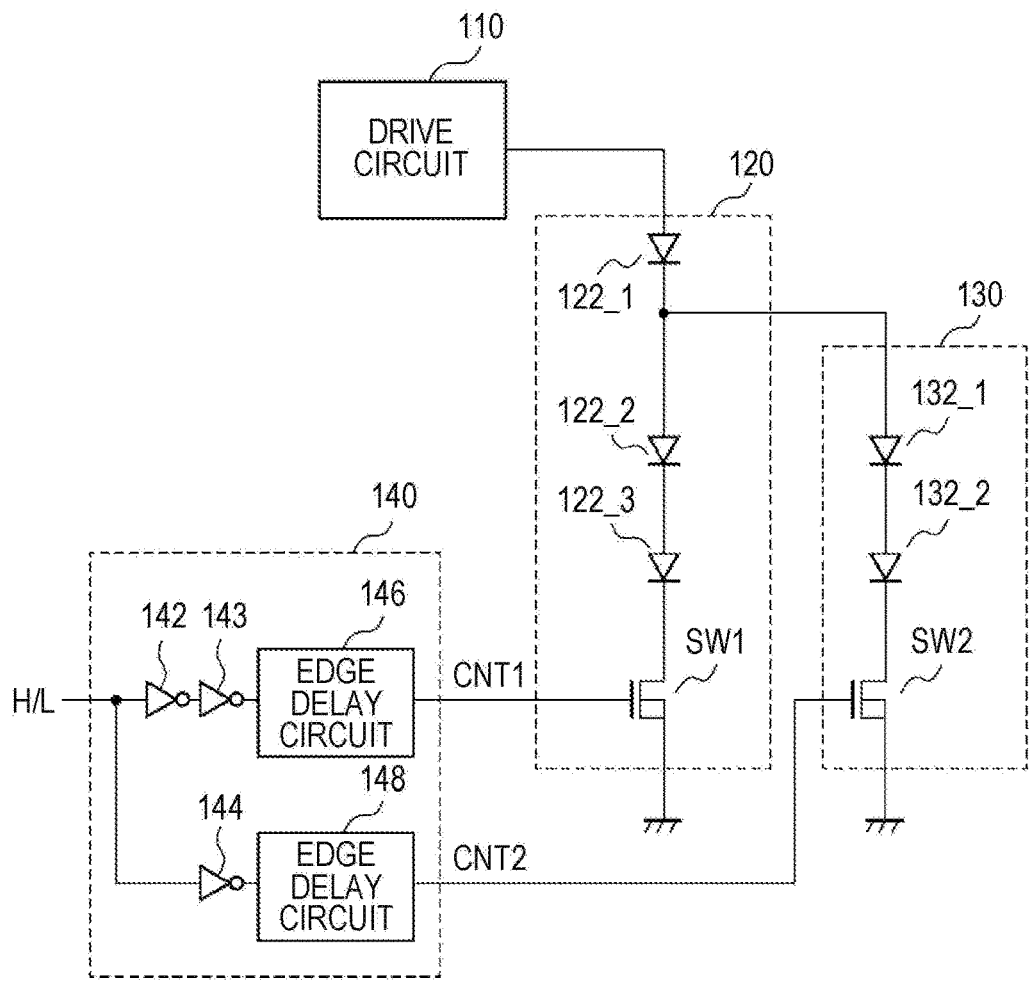
FIG. 4A is a circuit diagram illustrating an example of a configuration of the lamp module illustrated in FIG. 2.

Next, a circuit diagram illustrating an example of a specific configuration of the lamp module 100A will be described. FIG. 4A is a circuit diagram illustrating an example of a configuration of the lamp module 100A illustrated in FIG. 2. The first switch SW1 and the second switch SW2 are N-channel MOS transistors, and ON and OFF of the first switch SW1 and the second switch SW2 are controlled by control signals CNT1 and CNT2 which are applied to the gates thereof.

The switching circuit 140 includes several inverters 142 to 144 and edge delay circuits 146 and 148. The H/L switching signal passing through the inverters 142 and 143 is input to the edge delay circuit 146. The edge delay circuit 146 receives an output H/L of the inverter 143, and inverts the output H/L to generate the control signal CNT1. The edge delay circuit 148 receives the H/L switching signal (an inverted logic) passing through the inverter 144, and inverts the signal to generate the control signal CNT2. The edge delay circuits 146 and 148 delay edges (negative edges when the switches are N-channel MOS transistors or NPN type bipolar transistors) of the control signals CNT1 and CNT2 which are output, the edges corresponding to turning-off. When the switches are P-channel MOS transistors or PNP type bipolar transistors, positive edges may be delayed. The number of stages of inverters may be designed such that the control signals CNT1 and CNT2 have appropriate logic levels with respect to the H/L switching signal.

Figure 4B:
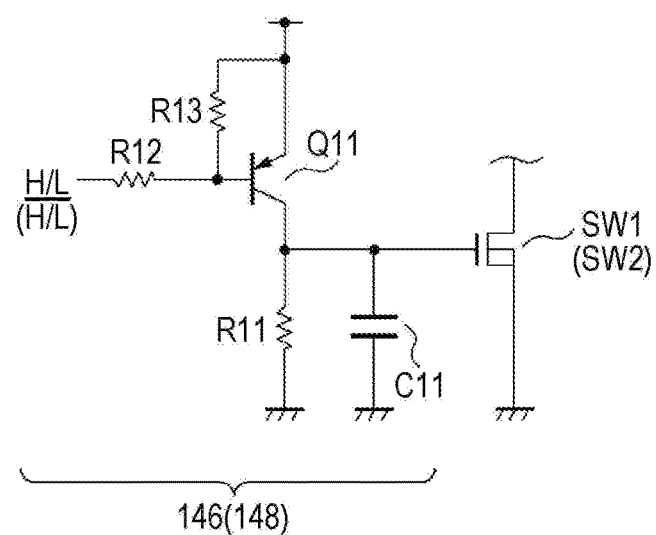
FIG. 4B is a circuit diagram illustrating an example of a configuration of an edge delay circuit.

FIG. 4B illustrates an example of the configuration of the edge delay circuit 146 (148). The edge delay circuit 146 includes resistors R11 to R13, a PNP type bipolar transistor Q11, and a capacitor C11. The capacitor C11 is connected to the gate of the NMOS transistor which is the first switch SW1. The resistor R11 is connected in parallel to the capacitor C11. The collector of the transistor Q11 is connected to the capacitor C11, and the H/L switching signal is input to the base of the transistor Q11 via the resistor R12. The resistor R13 is provided between the base and the emitter of the transistor Q11. When the input IN of the edge delay circuit 146 is changed to low, the capacitor C11 is charged with a collector current of the transistor Q11, and the control signal CNT1 rises rapidly. When the input IN of the edge delay circuit 146 is changed to high, the collector current of the transistor Q11 is interrupted. At this time, the electric charge of the capacitor C11 is slowly discharged via the resistor R11 and thus the control signal CNT1 decreases slowly. That is, only the negative edge of the control signal CNT1 is selectively delayed.

Those skilled in the art will understand that the configuration of the switching circuit 140 illustrated in FIGS. 4A and 4B is only an example and the disclosure is not limited thereto.

Figure 5:
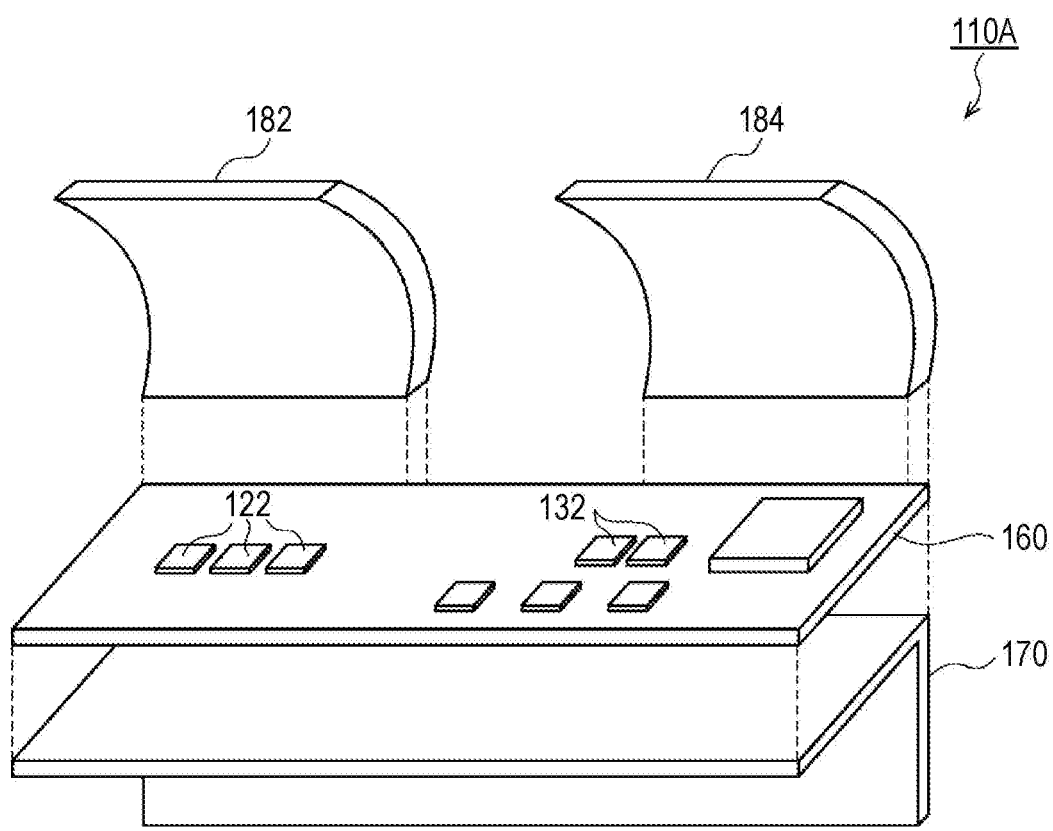
FIG. 5 is an exploded perspective view of the lamp module.

Next, the structure of the lamp module 100A will be described. FIG. 5 is an exploded perspective view of the lamp module 100A. Constituent components of the lamp module 100A are mounted on a common substrate 160. Specifically, in addition to the plurality of light emitting elements 122 and the plurality of light emitting elements 132, the first switch SW1, the second switch SW2, and the constituent components of the drive circuit 110 and the switching circuit 140 are mounted on the substrate 160. A reflector 182 receives light emitted from the light emitting elements 122 and forms light distribution pattern for the low-beam using reflected light thereof. Similarly, a reflector 184 receives light emitted from the light emitting elements 132 and forms the light distribution pattern for the high-beam using reflected light thereof. A heat dissipation plate (a heat sink) 170 is in contact with the side (a reverse surface) of the substrate 160, which is opposite to the mounting surface (i.e., the surface on which the light emitting elements 122 and the light emitting elements 132 are mounted) of the substrate 160. The heat dissipation plate 170 dissipates heat of the first light source 120 and the second light source 130.

In a modification of FIG. 5, a plurality of heat dissipation plates 170 may be provided and the heat dissipation plates 170 may be brought into contact with and fixed to positions on the side (the reverse surface) of the common substrate 160, which is opposite to the mounting surface of the substrate 160. The positions correspond to the light emitting elements 122 and 132.

Figure 6A:
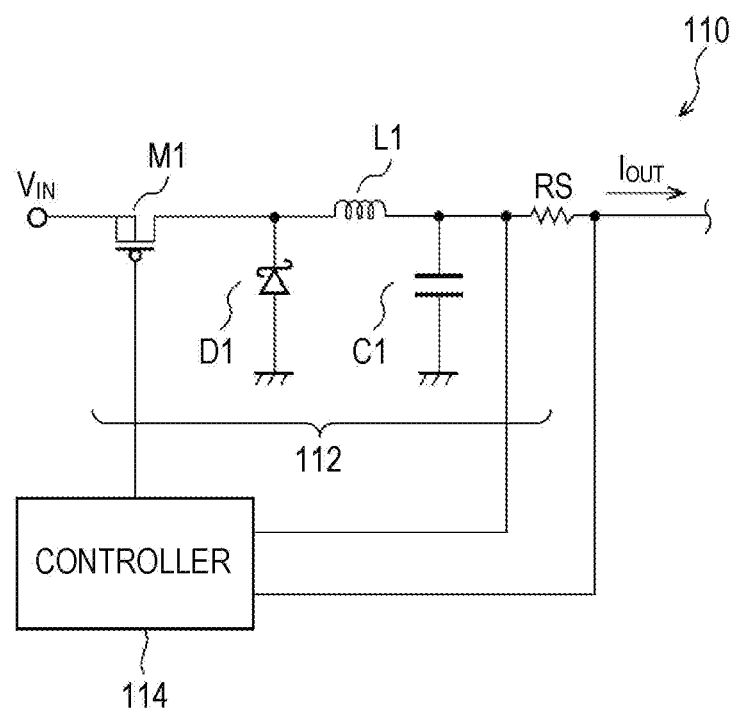
FIGS. 6A and 6B are circuit diagrams illustrating examples of a configuration of a drive circuit.
Figure 6B:
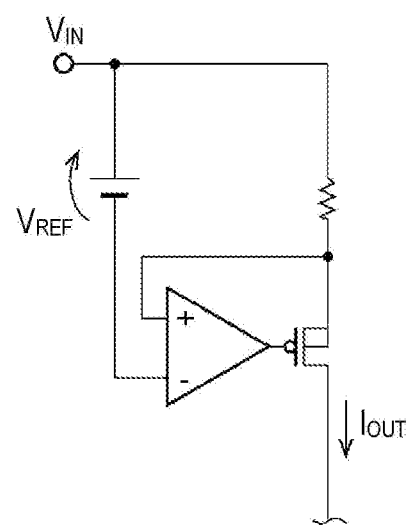

FIGS. 6A and 6B are circuit diagrams illustrating examples of the configuration of the drive circuit 110. The drive circuit 110 in FIG. 6A includes a step-down converter 112 and a controller 114 for the step-down converter 112. The step-down converter 112 includes a switching transistor M1, a rectifier element D1, an inductor L1, a capacitor C1, and a sense resistor Rs. The sense resistor Rs is provided on a path of the drive current $I_{OUT}$. The controller 114 controls the switching transistor M1 such that the decreased voltage $V_s$ ($V_s = I_{OUT} \times R_s$) of the sense resistor Rs becomes close to a predetermined target voltage $V_{REF}$. Accordingly, the output current $I_{OUT}$ is stabilized to be close to $I_{REF} = V_{REF}/R_s$.

A rectifier element of a synchronous rectifier type using a transistor may be employed as the rectifier element D1. When the number M of light emitting elements 122 connected in series is large, a step-up converter may be used.

As illustrated in FIG. 6B, the drive circuit 110 may include a linear regulator.

Figure 7:
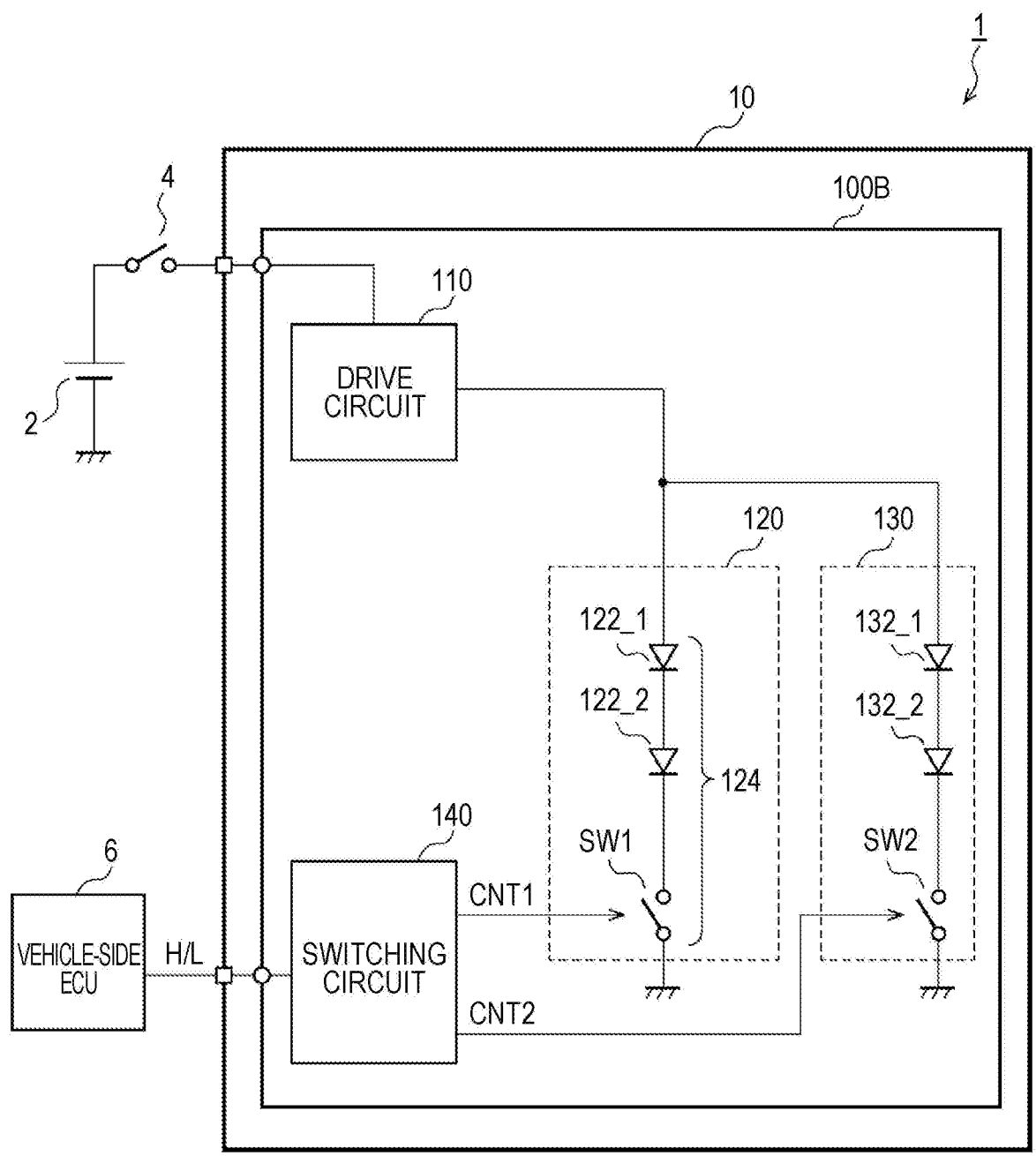
FIG. 7 is a block diagram illustrating a lamp module according to a second embodiment.

FIG. 7 is a block diagram illustrating a lamp module 100B according to a second embodiment. A difference from the first embodiment will be described below. In FIG. 7, the first light source 120 includes two (M=2) light emitting elements 122_1 and 122_2. The second light source 130 is connected in parallel to a series-connected circuit 124 including all the M light emitting elements 122_1 to 122_2 and the first switch SW1. Accordingly, in FIG. 7, the first light source 120 can be completely unlit in a period in which the second function is selected.

In the lamp module 100B illustrated in FIG. 7, similarly to the first embodiment, the first function may be a low-beam function and the second function may be a high-beam function. Alternatively, the first function may be a function of serving as a daytime running lamp and the second function may be a function of serving as a clearance lamp.

Figure 8:
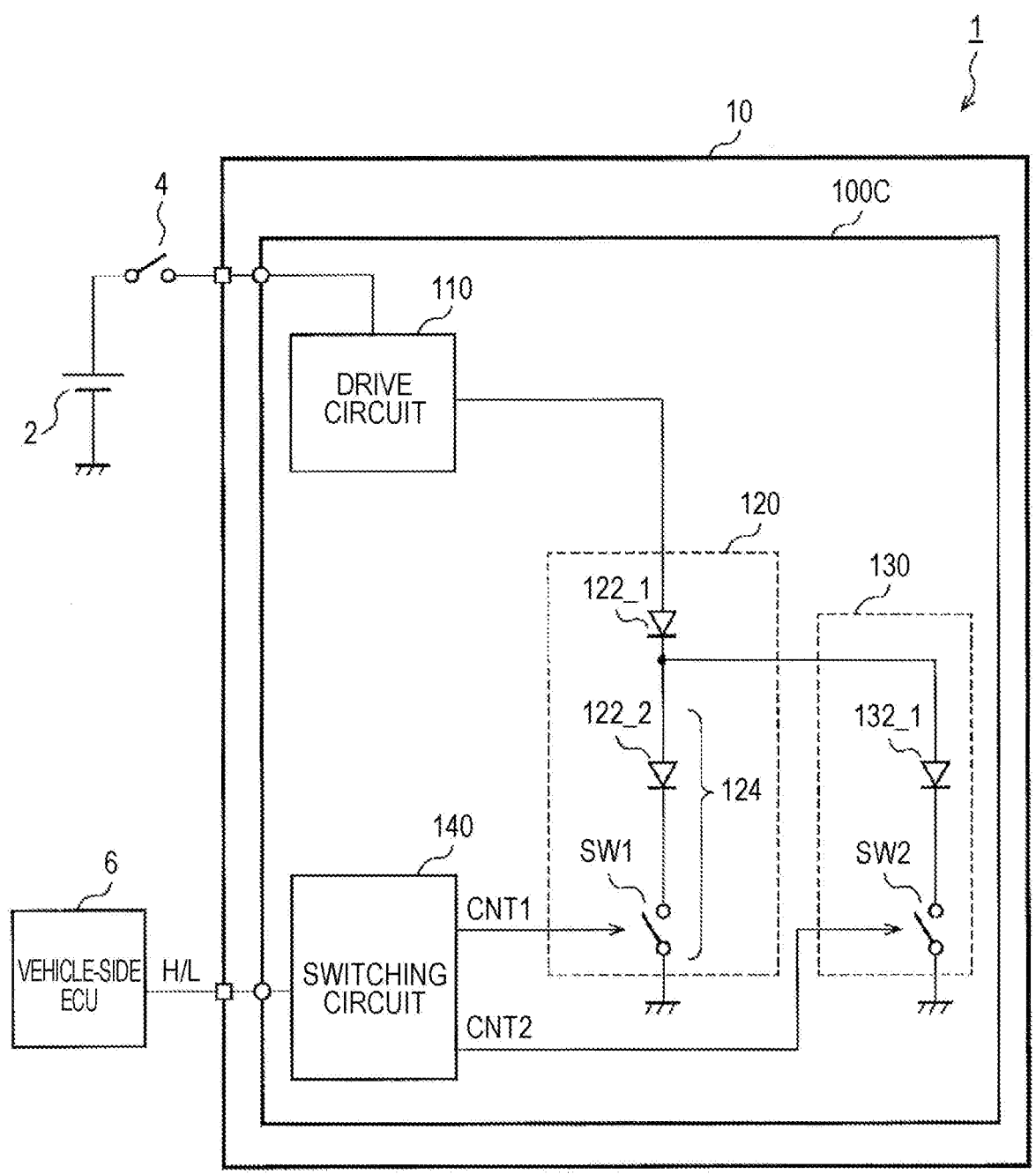
FIG. 8 is a block diagram illustrating a lamp module according to a third embodiment.

FIG. 8 is a block diagram illustrating a lamp module 100C according to a third embodiment. The third embodiment is different from the first embodiment in the number M of light emitting elements 122 and the number N of light emitting elements 132. M=2 and N=1 in FIG. 8.

The embodiments of the disclosure have been described above. The embodiments are examples and those skilled in the art will understand that combinations of the elements or the processes can be variously modified and such modifications belong to the scope of the disclosure. Such modifications will be described below.

Figure 9:
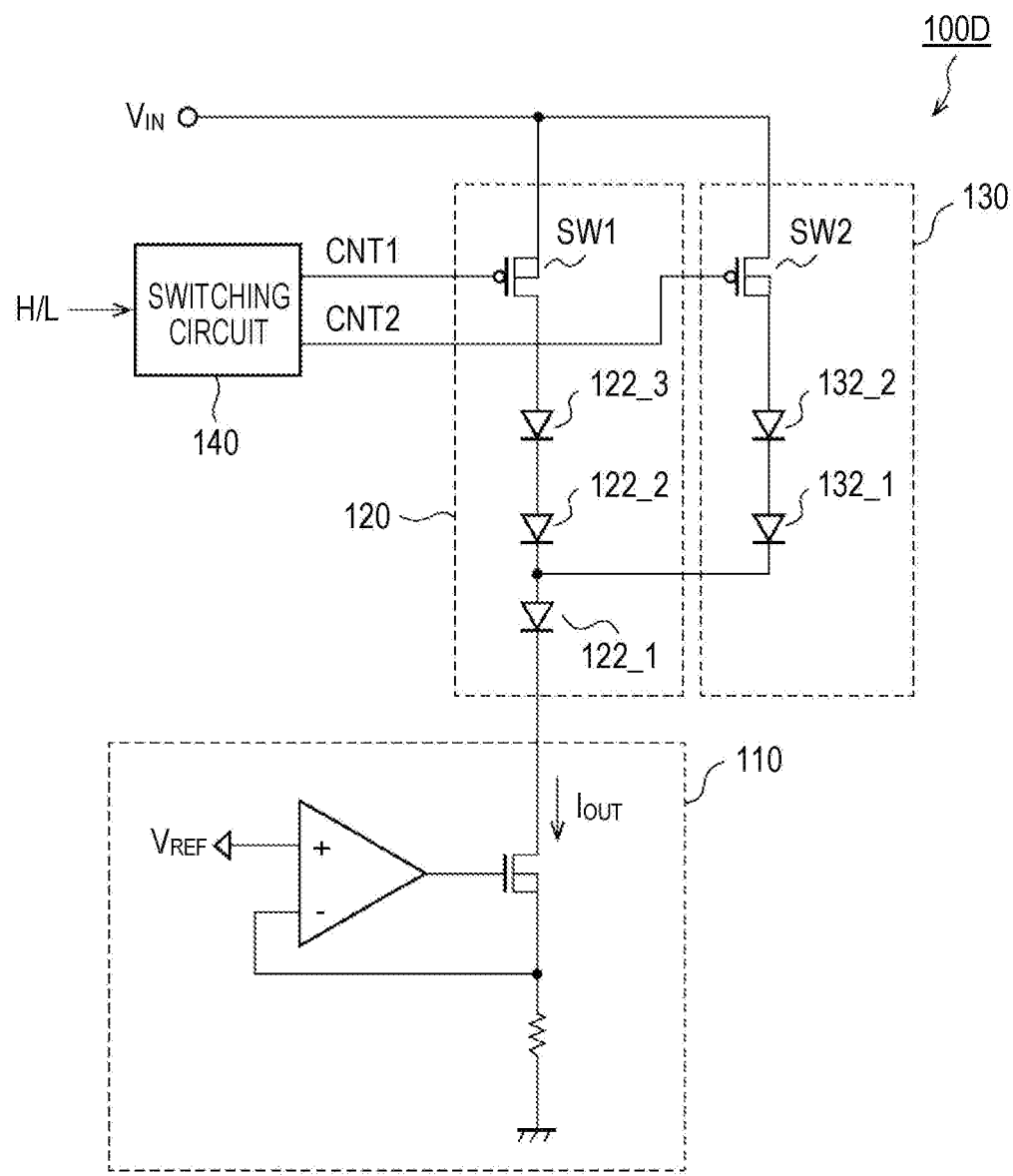
FIG. 9 is a circuit diagram illustrating a lamp module according to Modified Example 1.

FIG. 9 is a circuit diagram illustrating a lamp module 100D according to Modified Example 1. The drive circuit 110 includes a constant-current driver of a current sink type (a linear regulator). The lamp module 100D is obtained by vertically inverting the lamp module 100A illustrated in FIG. 2. The first switch SW1 and the second switch SW2 are P-channel MOS transistors and are in the ON state when the control signals CNT1 and CNT2 are low. Accordingly, with regard to the switching circuit 140, edges of the control signals CNT1 and CNT2 corresponding to turning-off are positive edges, and thus, the switching circuit 140 may delay the positive edges of the control signals CNT1 and CNT2.

Figure 10:
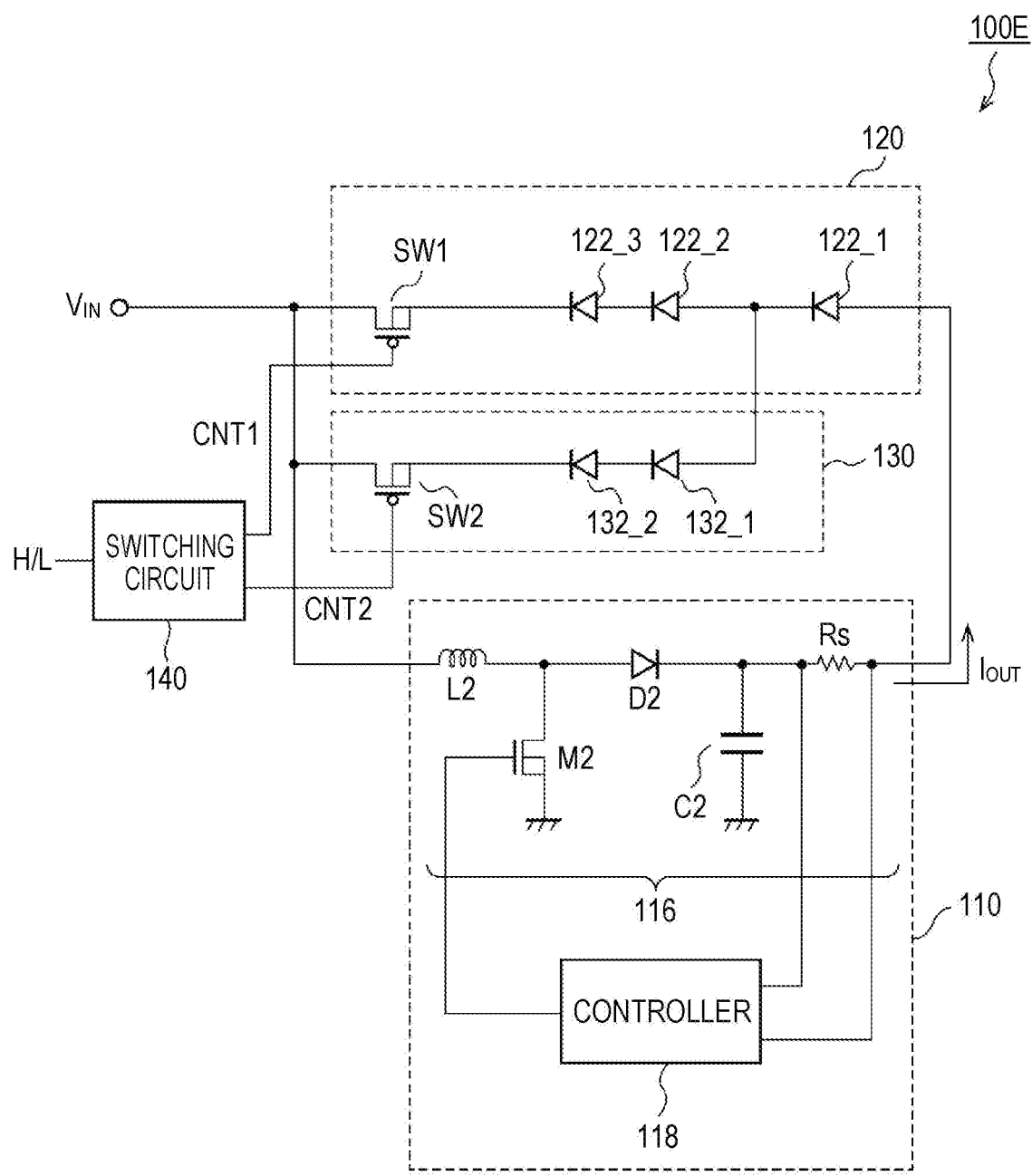
FIG. 10 is a circuit diagram illustrating a lamp module according to Modified Example 2.

FIG. 10 is a circuit diagram illustrating a lamp module 100E according to Modified Example 2. In the lamp module 100E, the drive circuit 110 includes a step-up converter 116 and a controller 118. The step-up converter 116 includes an inductor L2, a switching transistor M2, a rectifier element D2, a capacitor C2, and a sense resistor Rs. The controller 118 controls the switching transistor M2 such that the decreased voltage of the sense resistor Rs becomes close to a target voltage, and thus stabilizes the output current $I_{OUT}$. The first light source 120 and the second light source 130 which are loads are provided such that the cathodes thereof are directed toward an input terminal of the drive circuit 110 and the anodes thereof are directed toward an output terminal of the drive circuit 110.

In the embodiments, the H/L switching signal is a binary signal with high and low values, but the H/L switching signal is not limited thereto and may have another signal format. In this case, the switching circuit 140 may be configured to determine a function which is currently indicated based on the H/L switching signal and then to generate appropriate control signals CNT1 and CNT2.

The arrangement of the switches SW1 and SW2 is not limited to the arrangements described in embodiments, and the switches may be arranged in combination with control of the switching circuit 140 to switch between (i) a state in which the output current $I_{OUT}$ of the drive circuit 110 flows into the first light source 120, (ii) a state in which the output current $I_{OUT}$ of the drive circuit 110 flows into the second light source 130, and (iii) a state in which the output current $I_{OUT}$ of the drive circuit 110 is divided and flows into the first light source 120 and the second light source 130. Accordingly, the number of switches is not limited to two, and three or more switches may be used.

From this point of view, a lamp module according to an aspect of the disclosure may be as follows. A lamp module (100) is configured to switch between a first function and a second function. A first light source (120) includes M light emitting elements and a second light source (130) includes N light emitting elements. M is equal to or larger than 1, and N is equal to or larger than 1. A drive circuit (110) is provided for both the first light source (120) and the second light source (130), and has a constant-current output. A switching circuit (140) is configured to receive a switching signal for indicating switching between the first function and the second function, and to switch a path of an output current of the drive circuit (110) such that (i) the output current of the drive circuit (110) flows in the first light source (120) while the first function is indicated, (ii) the output current of the drive circuit (110) flows in the second light source (130) while the second function is indicated, and (iii) the output current of the drive circuit (110) flows in both the first light source (120) and the second light source (130) at a time of switching between the first function and the second function. In this aspect, one or more switches for switching a current path may be disposed in parallel to some light emitting elements While the embodiments of the disclosure have been specifically described above, the embodiments represent merely the principles and applications of the disclosure. Thus, various modifications may be made to the embodiments, and arrangements in the embodiments may be changed without departing from the scope of the disclosure.

What is claimed is:

1. A lamp module configured to switch between a first function and a second function, the lamp module comprising:
   a drive circuit with a constant-current output;
   a first light source including M light emitting elements and a first switch that are connected in series to an output of the drive circuit,
   a second light source including N light emitting elements and a second switch that are connected in series, the second light source being provided in parallel to a series-connected circuit including a part of or all of the M light emitting elements and the first switch, N being equal to or larger than 1; and
   a switching circuit configured to receive a switching signal for indicating switching between the first function and the second function, and to control the first switch and the second switch such that the first switch is in an on state and the second switch is in an off state while the first function is indicated, the first switch is in an off state and the second switch is in an on state while the second function is indicated, and both the first switch and the second switch are in the on states at a time of switching between the first function and the second function; wherein
   the first function is a low-beam function and the second function is a high-beam function;
   M is equal to or larger than 2; and
   the series-connected circuit includes the part of the M light emitting elements and the first switch.

2. The lamp module according to claim 1, wherein the drive circuit, the first light source, the second light source, and the switching circuit are mounted on a common substrate.

3. The lamp module according to claim 1, wherein the M light emitting elements and the N light emitting elements are cooled by a common heat sink.

4. The lamp module according to claim 1, wherein:
   the switching signal is a binary signal with high and low values;
   the switching circuit is configured to generate a first control signal that is supplied to the first switch and a second control signal that is supplied to the second switch based on the switching signal; and
   the switching circuit is configured to delay an edge of each of the first control signal and the second control signal, the edge corresponding to turning-off.

5. A lamp module configured to switch between a first function and a second function, the lamp module comprising:
   a drive circuit with a constant-current output;
   a first light source including M light emitting elements and a first switch that are connected in series to an output of the drive circuit, M being equal to or larger than 1;
   a second light source including N light emitting elements and a second switch that are connected in series, the second light source being provided in parallel to a series-connected circuit including a part of or all of the M light emitting elements and the first switch, N being equal to or larger than 1; and
   a switching circuit configured to receive a switching signal for indicating switching between the first function and the second function, and to control the first switch and the second switch such that the first switch is in an on state and the second switch is in an off state while the first function is indicated, the first switch is in an off state and the second switch is in an on state while the second function is indicated, and both the first switch and the second switch are in the on states at a time of switching between the first function and the second function; wherein
   the first function is a function of serving as a daytime running lamp; and
   the second function is a function of serving as a clearance lamp.

6. A lamp module configured to switch between a first function and a second function, the lamp module characterized by comprising:
   a first light source including M light emitting elements,
   a second light source including N light emitting elements, N being equal to or larger than 1;
   a drive circuit with a constant-current output that is provided for both the first light source and the second light source; and
   a switching circuit configured to receive a switching signal for indicating switching between the first function and the second function, and to switch a path of an output current of the drive circuit such that the output current of the drive circuit flows in the first light source while the first function is indicated, the output current of the drive circuit flows in the second light source while the second function is indicated, and the output current of the drive circuit flows in both the first light source and the second light source at a time of switching between the first function and the second function; wherein the first function is a low-beam function and the second function is a high-beam function;

M is equal to or larger than 2; and the series-connected circuit includes the part of the M light emitting elements and the first switch.

7. A lamp module configured to switch between a first function and a second function, the lamp module comprising:
- a drive circuit with a constant-current output;
- a first light source including M light emitting elements and a first switch that are connected in series to an output of the drive circuit, M being equal to or larger than 1;
- a second light source including N light emitting elements and a second switch that are connected in series, the second light source being provided in parallel to a series-connected circuit including a part of or all of the M light emitting elements and the first switch, N being equal to or larger than 1; and
- a switching circuit configured to receive a switching signal for indicating switching between the first function and the second function, and to control the first switch and the second switch such that the first switch is in an on state and the second switch is in an off state while the first function is indicated, the first switch is in an off state and the second switch is in an on state while the second function is indicated, and both the first switch and the second switch are in the on states at a time of switching between the first function and the second function; wherein the first function is a function of serving as a daytime running lamp; and the second function is a function of serving as a clearance lamp.

* * * * *